United States Patent
Sekikawa (10) Patent No.: US 6,304,360 B1
(45) Date of Patent: Oct. 16, 2001

(54) OPTICAL SCANNING DEVICE

(75) Inventor: Yoshihito Sekikawa, Iwatsuki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/455,454

(22) Filed: Dec. 6, 1999

(30) Foreign Application Priority Data

Dec. 18, 1998 (JP) .................................... 10-361358

(51) Int. Cl.⁷ .................................................. G02B 26/08
(52) U.S. Cl. .......................... 359/204; 359/206; 359/217; 347/241; 347/242
(58) Field of Search ...................... 359/196, 198, 359/201, 203, 204, 205, 206, 207, 208, 216, 217, 218, 219; 347/241, 242, 243, 245

(56) References Cited

U.S. PATENT DOCUMENTS

| | | | | |
|---|---|---|---|---|
| 5,166,704 | * | 11/1992 | Yasuda | 359/204 |
| 5,251,055 | * | 10/1993 | Koide | 359/216 |
| 5,757,535 | * | 5/1998 | Ichikawa | 359/204 |
| 6,052,211 | * | 4/2000 | Nakajima | 359/204 |
| 6,088,146 | * | 7/2000 | Takeshita et al. | 359/204 |

FOREIGN PATENT DOCUMENTS 62-189420    8/1987  (JP) .

* cited by examiner

Primary Examiner—Darren Schuberg
(74) Attorney, Agent, or Firm—Oliff & Berridge, PLC (57) ABSTRACT

The optical scanning device of the present invention which handles plural light beams reduces the number of the optical components to the minimum, and thereby intends to reduce the cost, shrink the size, and secure high performance. The optical scanning device of the present invention minimizes the number of deflectors that deflect light beams with a constant angular velocity in a direction corresponding to the main scanning direction to one, and also minimizes the number of polygon mirrors included in the deflector and the number of rotation drive units of the polygon mirror each to one. Further, the device makes up two fθ lens systems for converging the light beams into a specific size and scanning the beam spots with a substantially constant speed with two pairs of the fθ lenses each, and disposes the fθ lens systems on the both sides of the deflector. Two light beams each fall on and go out from the fθ lens systems, and the deflector performs the main scanning of these four light beams.

12 Claims, 7 Drawing Sheets

OPTICAL SCANNING DEVICE

BACKGROUND OF THE INVENTION

1. Field of the Invention

The present invention relates to an optical scanning device for use in an image formation device such as a laser printer or a digital copying machine that forms an image by scanning a laser beam according to an image information and exposing the image on a photoreceptor. Specifically, it relates to an optical scanning device suitable for use in a multicolored image formation device that superposes plural images formed by plural laser beams to form one image.

2. Description of the Related Art

In the conventional image formation device using the electrographic system, it is a usual exercise to scan a light beam according to an image information by an optical scanning device and form a latent image on an electrified photoreceptor, and to transfer a developed image acquired by developing this latent image to a printing paper and form the image.

Recently, accompanied with the spread of colored documents, there has been developed a full-colored image formation device that forms the developed images of each of black (K), yellow (Y), magenta (M), cyan (C) by the electrographic system, and sequentially transfers these developed images to form a full colored image.

Specially for applications that require a high speed in image formation, a so-called tandem system full-colored image formation device is being developed, which contains plural independent image formation devices, continuously transfers the developed images formed by these devices to a single transfer medium, and forms a full-colored image in one cycle.

A conventional full-colored image formation device will now be explained with reference to FIG. 5A and FIG. 5B.

Figure 5A:
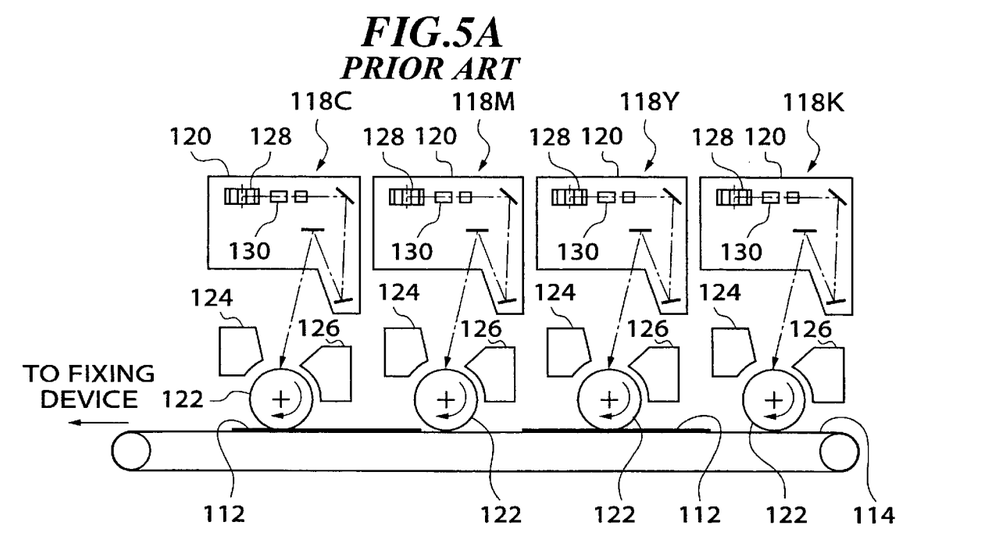
FIG. 5A is a sectional side view illustrating a schematic construction of a conventional full-colored image formation device in which four image formation devices are arrayed in series.
Figure 5B:
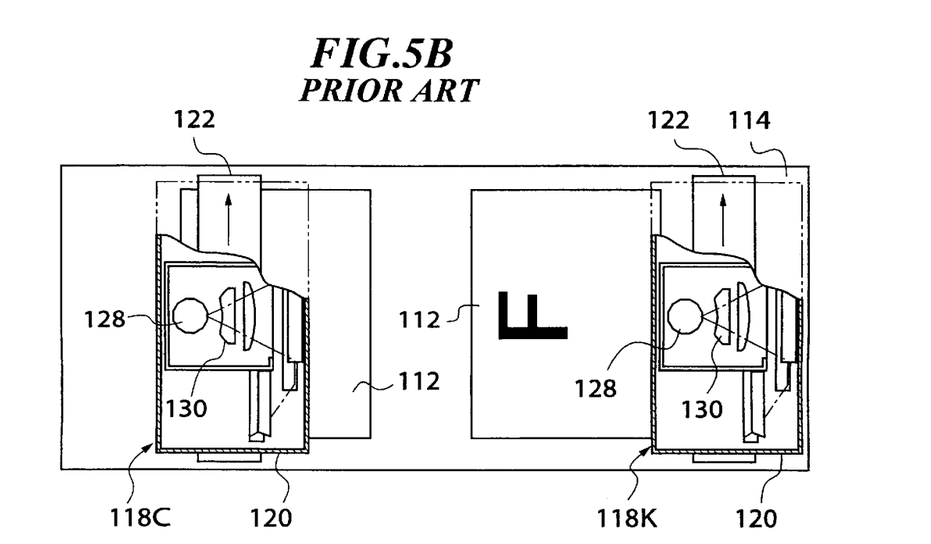
FIG. 5B is a sectional plan view thereof.

As shown in FIG. 5A, FIG. 5B, an image formation device 118K, image formation device 118Y, image formation device 118M, and image formation device 118C are provided in the order of black (B), yellow (Y), magenta (M), cyan (C), from the upstream in the paper feeding direction of a paper conveyance belt 114. To each of the image formation devices, a sub-unit constituting the electrographic process is configured around a photosensitive drum 122 as the image carrier.

In this device, first an electrification device 124 electrifies the photosensitive drum 122, and then an optical scanning device 120 scans to expose a laser beam according to the image information onto the photosensitive drum 122 to form a latent image.

Next, after a development device 126 develops the latent image, the developed image is transferred to a printing paper 112 that is conveyed at a constant speed.

This process is carried out in the order of K, Y, M, C, and a fixing device not illustrated fixes the transferred image to the paper 112, which thereafter is ejected.

The optical scanning device 120 possesses a configuration such that a laser beam source (not illustrated) emits a light beam according to image information, a rotational polygon mirror 128 deflects the light beam with a constant angular velocity, and two pieces of fθ lenses 130 form an image on the photosensitive drum 122 as a beam spot scanning at a constant speed.

And, in the configuration shown in FIG. 5A, FIG. 5B, the optical scanning devices 120 each have the polygon mirrors 128 individually.

And, the Japanese Published Unexamined Patent Application No. Sho 62-189420 mentions that, since the aforementioned conventional colored image formation device contains plural optical scanning devices, there are problems of high cost, size expansion of the device, disturbances of the images, and the like. And, it also mentions that the above problems can be solved by employing one motor for driving to rotate plural polygon mirrors, and by integrating the optical scanning devices into one package.

There are, however, the following problems in the optical scanning device disclosed in the Japanese Published Unexamined Patent Application No. Sho 62-189420:

(1) As shown in FIG. 1, FIG. 2, FIG. 5 in the specification of the published application, the provision of plural polygon mirrors in the device increase the cost. Further, since the polygon mirrors each have differences in the flatness of each reflecting surface and the angle of inclination of each reflecting surface in the sub-scanning direction, there occur differences in the degree of blooming for each color, the fluctuations of the vertical lines, and the condensation and rarefaction of the scanning lines (the so-called, banding); and in consequence the superposed colored image can be unacceptable.

(2) As shown in the embodiment in FIG. 1 through FIG. 5 in the specification of the published application, the fθ lenses are laid out for the number of the beams, which increases the cost (this is because the beam needs to be transmitted through the optical axis in the general fθ lenses, in order to secure the optical performance).

(3) In the embodiment that employs four polygon mirrors (see FIG. 1, FIG. 2 in the specification of the published application), a giant load is imposed on the motor as a rotation drive unit, and it could be the unrealistic in view of the cost and the power consumption.

Figure 6:
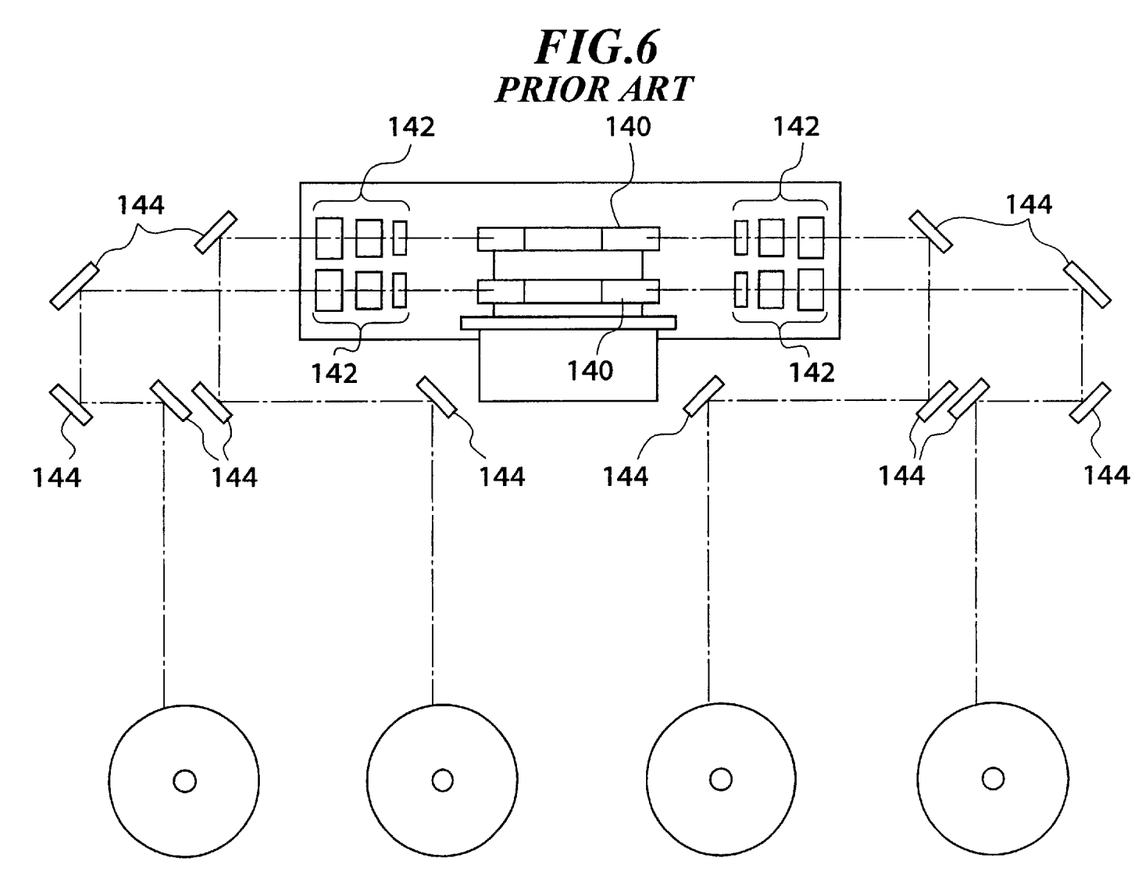
FIG. 6 is a sectional side view of the embodiment in the conventional example (the Japanese Published Unexamined Patent Application No. Sho 62-189420)
Figure 7:
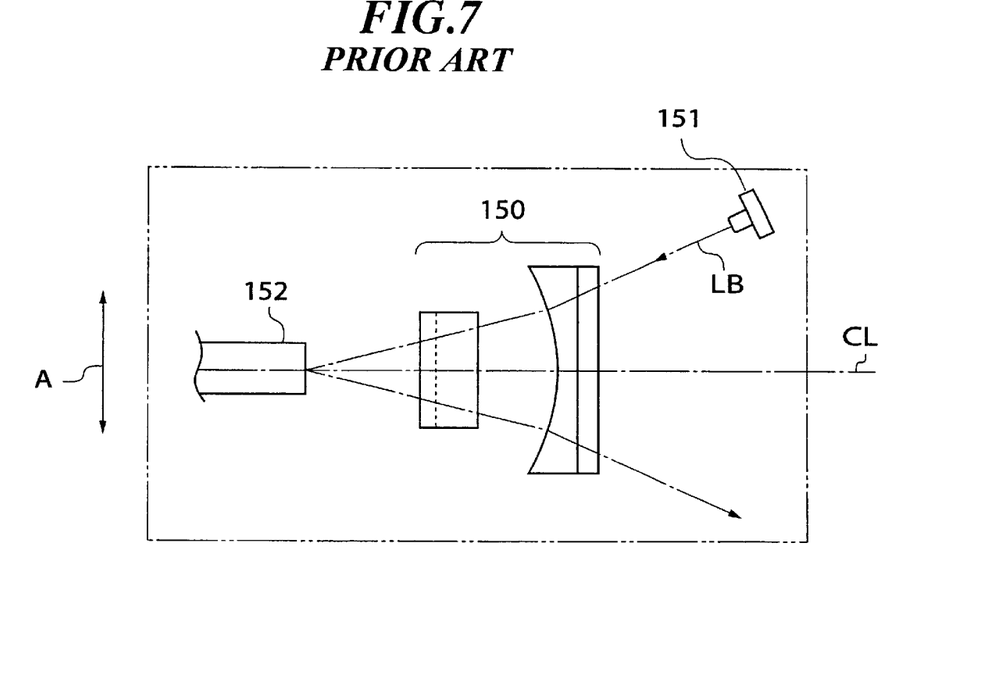
FIG. 7 is a side view when a double-path frontal incident system is applied to the optical system of the conventional example.
Figure 8:
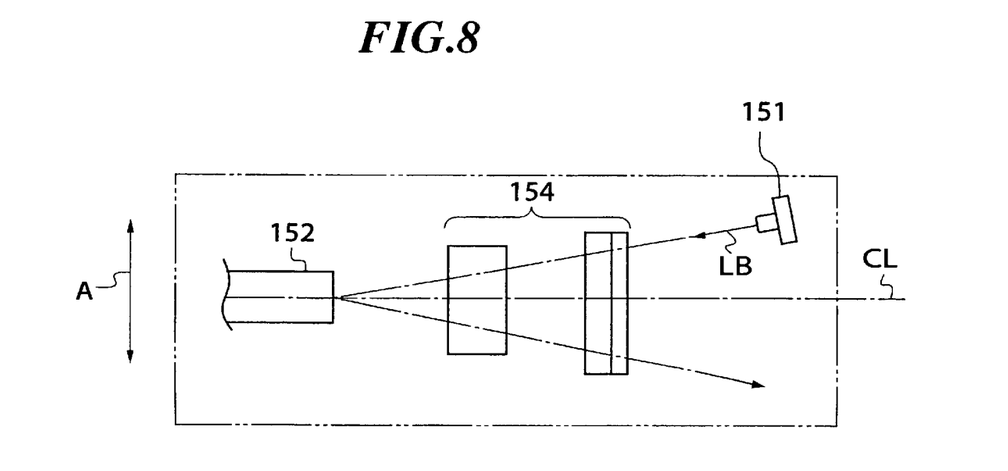
FIG. 8 is a side view when a double-path frontal incident system is applied to the optical system of the present invention.

(4) As shown in FIG. 6, in the embodiment that employs both sides of polygon mirrors 140 at the same time and reduces the number of the polygon mirrors 140 to two, though it is realistic in practical use, since the optical components including fθ lenses 142, reflection mirrors 144, and the like are arrayed on both sides of the polygon mirrors 140, the entire optical scanning device becomes enormously large in the lateral direction.

Although slight miniaturization can be realized by using multiple pieces of the reflection mirrors 144, not only the cost is increased for the increased number of the reflection mirrors 144, but also the adjustment mechanism for preventing the optical path deflection or the high-accuracy mechanical dimension is inevitably required, which involves a significant cost increase.

SUMMARY OF THE INVENTION

In view of the aforementioned circumstances, the present invention provides an optical scanning device for use in a multicolored image formation device that superposes plural images formed by plural light beams to produce one image, with a low cost and small size by minimizing the number of the components, and with high performance.

According to an aspect of the present invention, the optical scanning device, used in a multicolored image formation device that superposes a plurality of images formed on photoreceptors by plural light beams to obtain one multicolored image, has a single deflector that contains a single polygon mirror and a single rotation drive unit for rotating the polygon mirror, and reflects and deflects the light beams incident on the polygon mirror in a main scanning direction, plural light sources that emit the plural light beams, respectively, on the polygon mirror from both sides of the polygon mirror in a direction transverse to a rotation axis thereof, and two pairs of fθ lenses that are disposed on the both sides of the polygon mirror in the direction transverse to the rotation axis thereof, and at least transmit the light beams reflected and deflected by the polygon mirror to form spot images on the photoreceptors. In the device, the plural light beams are made incident on and emitted from each of both sides of the polygon mirror in the direction transverse to the rotation axis thereof.

The optical scanning device is able to reflect and deflect the light beams falling on the polygon mirror in the main scanning direction, by the rotation drive unit rotating the polygon mirror with a constant angular velocity.

The light beam reflected and deflected on the polygon mirror transmits through the fθ lens to thereby converge into a spot with a specific size on the photoreceptor, which is scanned with a virtually constant speed.

Here, the number of the deflectors that deflect the light beams with a constant angular velocity in the direction corresponding to the main scanning direction is reduced to one, the minimum, and the number of the polygon mirrors included in the deflector is reduced to one, the minimum, further, the fθ lens system for converging the light beams into a specific size and scanning the beam spots with a substantially constant speed is composed of only two pairs of the fθ lenses; and therefore, the optical scanning device is made up with a fewer number of components than the conventional device provided with the polygon mirrors and fθ lenses for each of the light beams, which successfully reduces the cost.

BRIEF DESCRIPTION OF THE DRAWINGS

Preferred embodiment of an optical scanning device according to the present invention will be described in detail based on the drawings.

DETAILED DESCRIPTION OF THE PREFERRED EMBODIMENT

One embodiment of an optical scanning device of the present invention will now be discussed with reference to FIG. 1 through FIG. 4.

Figure 1:
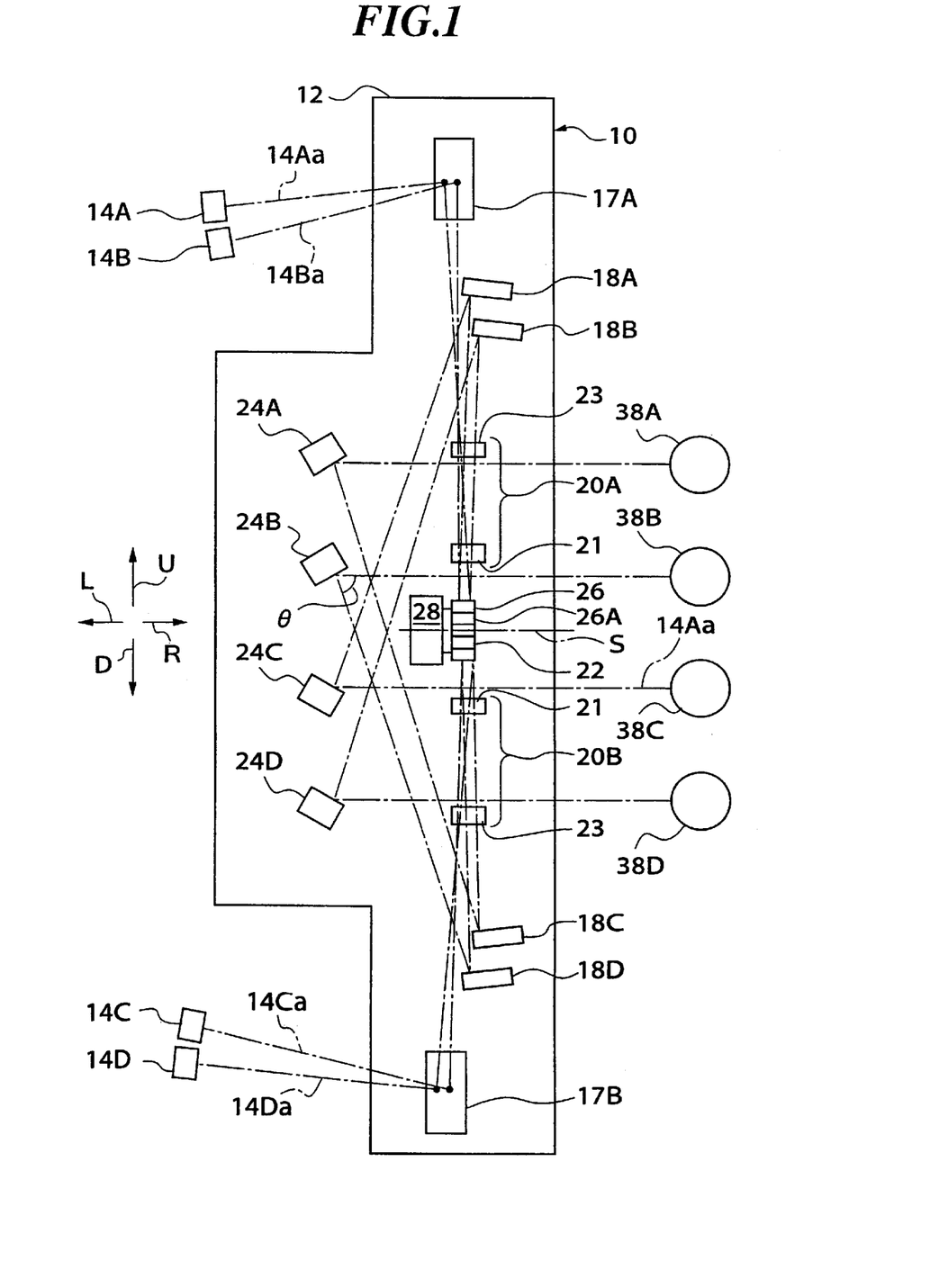
FIG. 1 is a side view to illustrate the total construction of an optical scanning device relating to an embodiment of the present invention.
Figure 2:
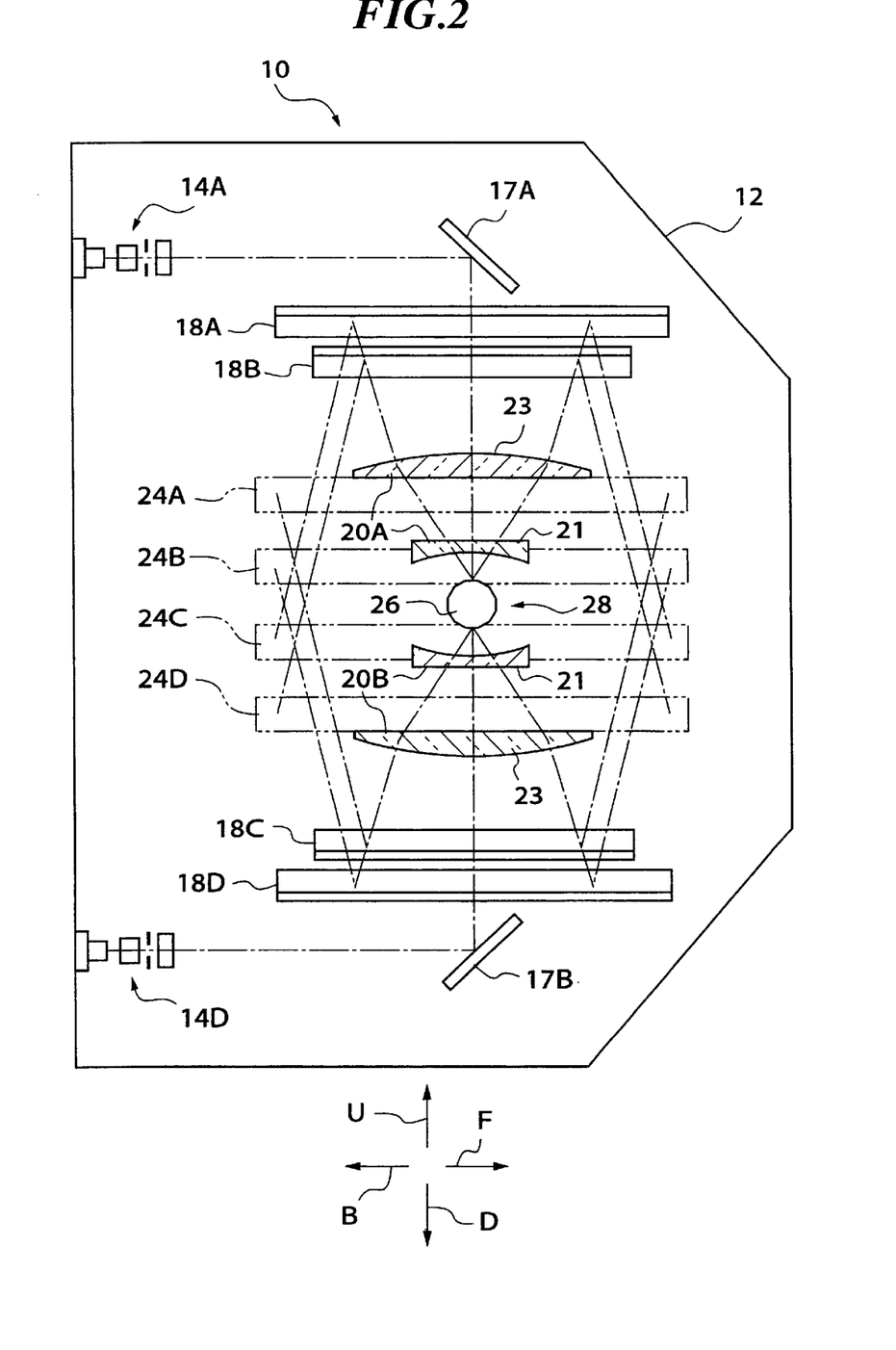
FIG. 2 is a plan view to illustrate the total construction of the optical scanning device relating to the embodiment of the present invention.
Figure 3:
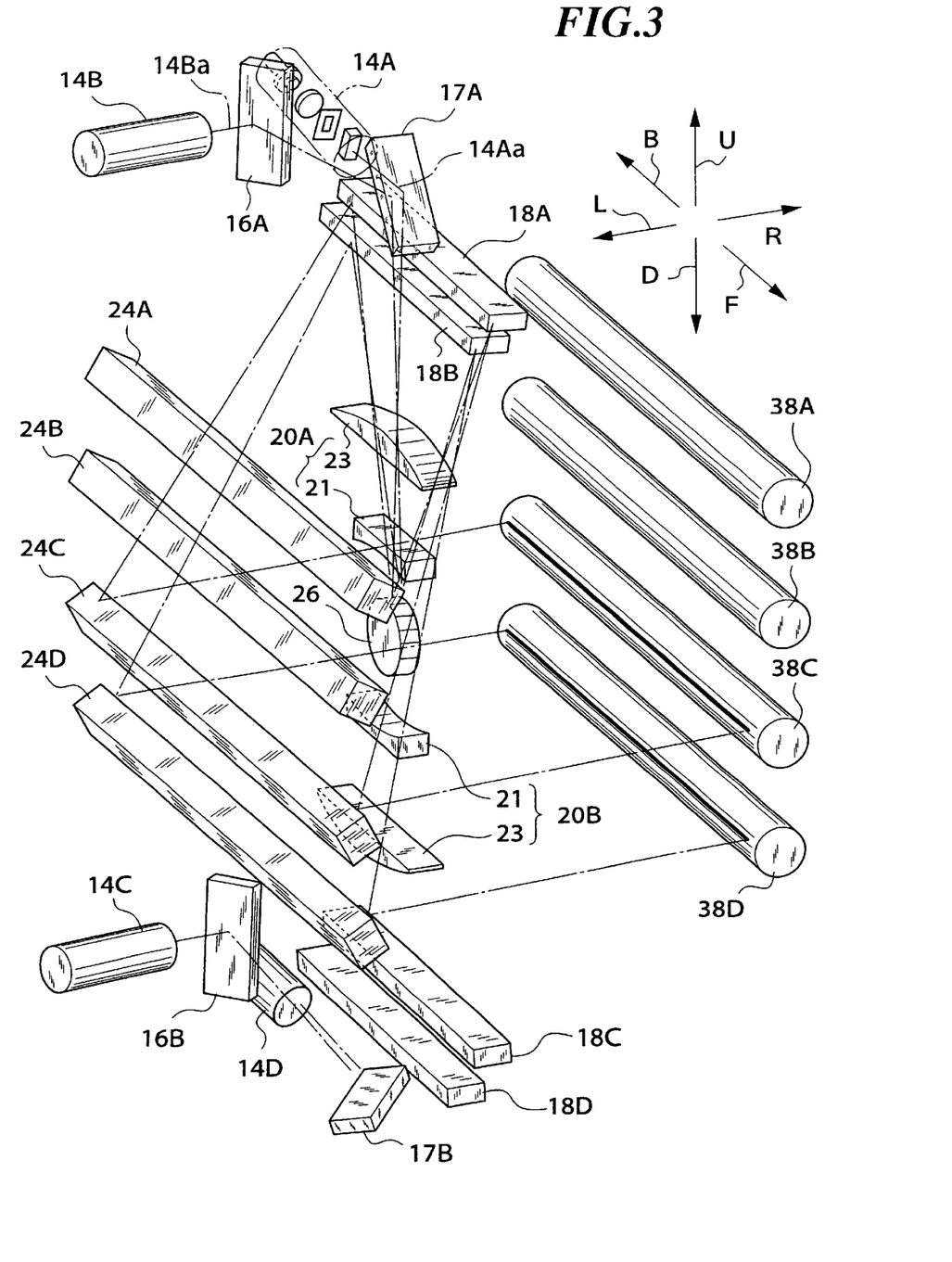
FIG. 3 is a perspective view to illustrate the total construction of the optical scanning device relating to the embodiment of the present invention.

As shown in FIG. 1 through FIG. 3, an optical scanning device 10 of this embodiment is comprised of an optical box 12, light sources 14A, 14B, 14C, 14D, plane mirrors 16A, 16B, plane mirrors 17A, 17B, plane mirrors 18A, 18B, 18C, 18D, fθ lens systems 20A, 20B, a deflector 22, cylindrical mirrors 24A, 24B, 24C, 24D, etc.

The fθ lens systems 20A, 20B each are composed of an fθ lens 21 and an fθ lens 23.

On the side of the arrow R of this optical scanning device 10, a photoreceptor 38A for cyan (C), photoreceptor 38B for magenta (M), photoreceptor 38C for yellow (Y), and photoreceptor 38D for black (B), which are the components of the multicolored image formation device, are arrayed vertically (in the directions of arrows U and D).

The deflector 22 contains a polygon mirror 26, and a rotation drive unit 28 for rotating the polygon mirror 26 is installed on the side of the arrow L of the polygon mirror 26.

The deflector 22 is disposed on the center of the optical box 12 so that the rotation axis S of the polygon mirror 26 is set in the horizontal direction (in the direction arrow L and arrow R). The fθ lens system 20A, plane mirrors 18A, 18B, and plane mirror 17A are disposed on the upper side of the deflector 22, and the fθ lens system 20B, plane mirrors 18C, 18D, and plane mirror 17B are disposed on the lower side of the deflector 22.

The cylindrical mirrors 24A, 24B are located on the side of the direction arrow L to the fθ lens system 20A, and the cylindrical mirrors 24C, 24D are located on the side of the direction arrow L to the fθ lens system 20B.

As shown in FIG. 2 and FIG. 3, the light source 14A is located in the direction arrow B to the plane mirror 17A, and the plane mirror 16A and the light source 14B are located on the side of the direction arrow L to the light source 14A.

In the same manner, the light source 14D is located in the direction arrow B to the plane mirror 17B, and the plane mirror 16B and the light source 14C are located on the side of the direction arrow L to the light source 14D.

The light sources 14A through 14D in FIG. 1 are located at different positions intentionally in order to make the explanation easily understandable.

The light sources 14A through 14D each contain a semiconductor laser 30 that emits a light beam, a collimator lens 32 that uniforms an incident light beam into a parallel light beam, a slit 34 that shapes the beam width, and a cylindrical lens 36 that transforms the light beam into a divergent light beam toward the main scanning direction and the sub-scanning direction.

The light sources 14A through 14D each radiate the diffused light beams whose divergent angle in a direction corresponding to the main scanning direction is greater than the divergent angle in a direction corresponding to the sub-scanning direction.

The semiconductor laser 30 is positioned inside against the focus position of the collimator lens 32, and a light beam emitted from the semiconductor laser 30 is transformed into a gently divergent light beam by the collimator lens 32 in a direction toward the sub-scanning and main scanning directions.

The slit 34 confines the beam width of the gently divergent light beam in the direction corresponding to the sub-scanning direction (since this embodiment takes on the overfilled optical system, the beam width in the direction corresponding to the main scanning direction is confined by the plane width (the width in the direction perpendicular to the axial direction) of the deflection plane 26A of the polygon mirror 26).

The light beam having passed through the slit 34 is transformed by the cylindrical lens 36 into a convergent light beam that converges only in the direction corresponding to the sub-scanning direction.

As shown in FIG. 1, the polygon mirror 26 receives, as the incident lights, two light beams each from the both upper and lower sides, namely, light beams 14A$a$, 14B$a$ from the upper side, and light beams 14C$a$, 14D$a$ from the lower side.

Next, the light beam 14A$a$ and light beam 14B$a$ will be explained.

The light beam 14A$a$ emitted from the light source 14A and the light beam 14B$a$ emitted from the light source 14B transmit through the fθ lens system 20A that has a power only in the direction corresponding to the main scanning direction, and fall on the deflection planes 26A of the polygon mirror 26.

The light beams 14A$a$, 14B$a$ incident on the deflection planes 26A converge near the surfaces of these deflection planes 26A, in the direction corresponding to the sub-scanning direction.

Here, since the plane width of the deflection planes 26A is smaller than the width of the light beams 14A$a$, 14B$a$ in the direction corresponding to the main scanning direction, these light beams 14A$a$, 14B$a$ become long slender line images across plural deflection planes 26A, on the surface of the polygon mirror 26.

Only the parts of the light beams 14A$a$, 14B$a$ which irradiate on one plane of the deflection planes 26A, of the long line images in the main scanning direction, are reflected and deflected, and again made incident on the fθ lens system 20A (the so-called overfilled optical system is configured).

Here, the light beam 14A$a$ having transmitted through the fθ lens system 20A is reflected slant by the plane mirror 18A to the direction of the allow L viewing from the deflector 22, and thereafter it reaches the cylindrical mirror 24C, which reflects it horizontally toward the photoreceptor 38C on the side of the direction arrow R. And, the light beam 14A$a$ incident on the fθ lens system 20A forms an image near the surface of the photoreceptor 38C in the main scanning direction, by the power in the direction corresponding to the main scanning direction of this fθ lens system 20A.

On the other hand, the light beam 14B$a$ transmitted through the fθ lens system 20A is reflected slant by the plane mirror 18B to the direction of the allow L viewing from the deflector 22, and thereafter it reaches the cylindrical mirror 24D, which reflects it horizontally toward the photoreceptor 38D on the side of the direction arrow R. And, the light beam 14B$a$ incident on the fθ lens system 20A forms an image near the surface of the photoreceptor 38D in the main scanning direction, by the power in the direction corresponding to the main scanning direction of this fθ lens system 20A.

Here, the light beam 14A$a$ converges near the surface of the photoreceptor 38C, by the functions of the cylindrical lens 36 and the cylindrical mirror 24C in the sub-scanning direction, and by the function of the fθ lens system 20A in the main scanning direction, and it irradiates a spot with a specific diameter on the surface of the photoreceptor 38C. Further, by the function of the fθ lens system 20A, the light beam 14A$a$ is scanned on the surface of the photoreceptor 38C with a substantially constant speed in the main scanning direction. Similarly, the light beam 14B$a$ converges near the surface of the photoreceptor 38D, by the functions of the cylindrical lens 36 and the cylindrical mirror 24D in the sub-scanning direction, and by the function of the fθ lens system 20A in the main scanning direction, and it irradiates a spot with a specific diameter on the surface of the photoreceptor 38D. Further, by the function of the fθ lens system 20A, the light beam 14B$a$ is scanned on the surface of the photoreceptor 38D with a substantially constant speed in the main scanning direction.

Further, the cylindrical mirror 24D has a power only in the direction corresponding to the sub-scanning direction, and it functions so as to decrease a displacement in the sub-scanning direction of the spot on the surface of the photoreceptor 38D, which is created by a slanted plane of each deflection plane 26A of the polygon mirror 26. In the same manner, the cylindrical mirror 24C has a power only in the direction corresponding to the sub-scanning direction, and it functions so as to decrease a displacement in the sub-scanning direction of the spot on the surface of the photoreceptor 38C, which is created by a slanted plane of each deflection plane 26A of the polygon mirror 26.

Figure 4:
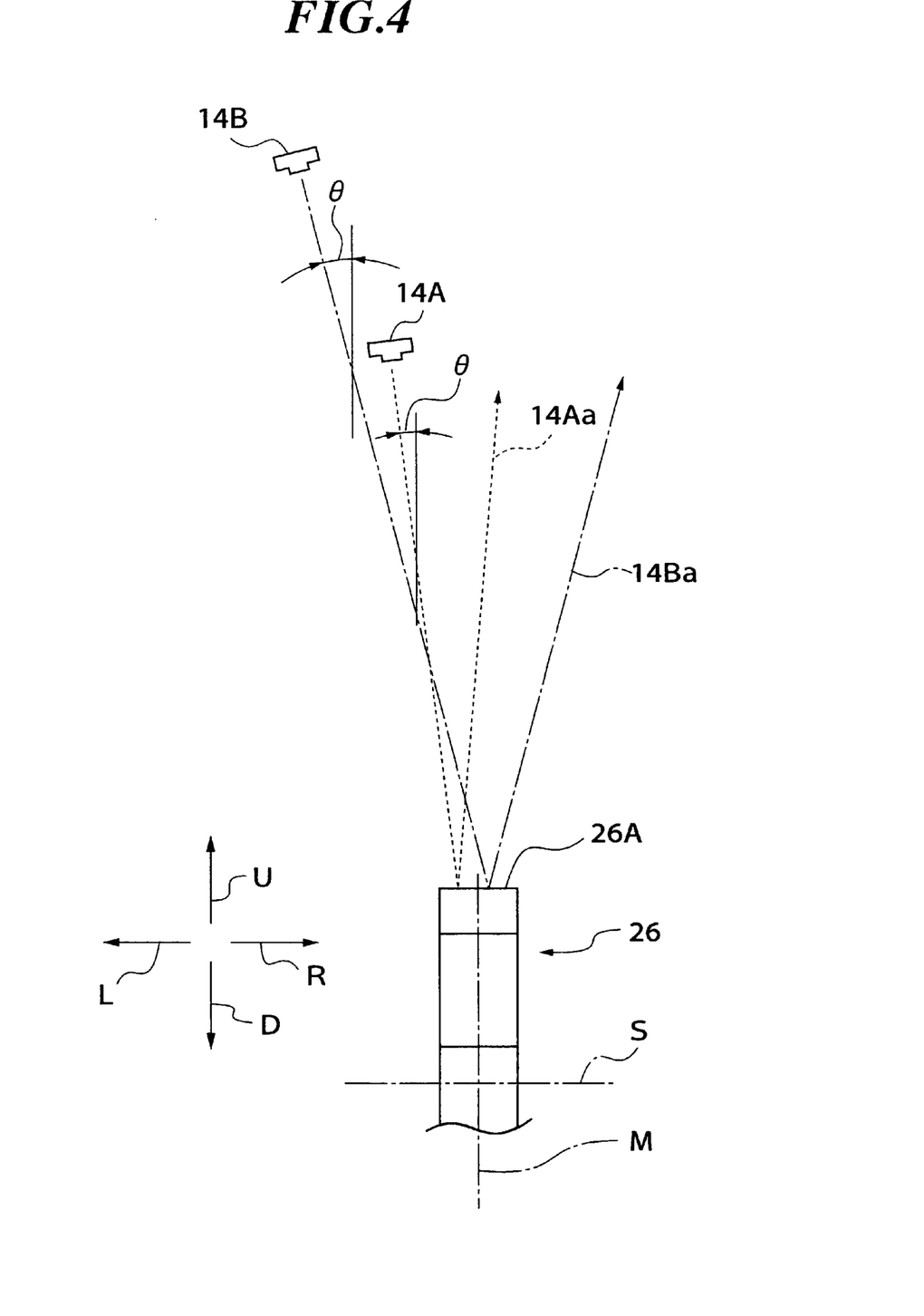
FIG. 4 is a side view viewed from a direction perpendicular to the axis of the polygon mirror, when a double-path frontal incident system is applied to the optical system of the embodiment of the present invention.

Further, in the optical system of this embodiment, as shown in FIG. 4 (though the optical components intervening between the light sources 14A, 14B and the polygon mirror 26 are omitted in FIG. 4), the two light beams 14A$a$, 14B$a$ incident on one side (upper side, in this case) of the polygon mirror 26 come in from the side of the direction arrow L against a virtual plane M perpendicular to the rotation axis S, which passes through the center of depth of the polygon mirror 26. However, the two light beams 14A$a$, 14B$a$ have different incident angles θ in the direction corresponding to the sub-scanning direction (the angle from the direction perpendicular to the rotation axis S of the polygon mirror 26).

In this embodiment, the incident angle θ of the light beam 14B$a$ emitted from the light source 14B is specified smaller than the incident angle θ of the light beam 14A$a$ emitted from the light source 14A. And, the incident point on the polygon mirror 26 of the light beam 14A$a$ having a smaller incident angle θ is positioned on the incident side of the light beams on the polygon mirror 26, namely, it is positioned on the side of the direction arrow L against the incident point of the light beam 14B$a$ having a greater incident angle θ on the polygon mirror 26.

The light sources 14C, 14D, plane mirror 16B, plane mirrors 18C, 18D, fθ lens system 20B, and cylindrical mirrors 24A, 24B against the light sources 14A, 14B, plane mirror 16A, plane mirrors 18A, 18B, fθ lens system 20A, and cylindrical mirrors 24C, 24D are disposed, as shown in FIG. 1, symmetrically with regard to the rotation axis S of the deflector 22; and the explanation about the light beam 14C$a$ emitted from the light source 14C and the light beam 14D$a$ emitted from the light source 14D will be omitted. Incidentally, the light beam 14C$a$ emitted from the light source 14C falls on the photoreceptor 38A, and the light beam 14D$a$ emitted from the light source 14D falls on the photoreceptor 38B.

The function of the optical scanning device 10 of this embodiment will now be described.

As mentioned above, the light beam 14A$a$ emitted from the light source 14A falls on the photoreceptor 38C, and the light beam 14B$a$ emitted from the light source 14B falls on the photoreceptor 38D, which form latent images on the surfaces of the photoreceptors.

In this embodiment, the number of the deflector 22 that deflects the four light beams with a constant angular velocity in the direction corresponding to the main scanning direction is reduced to one, being minimum, and the number of the polygon mirror 26 used for the deflector 22 is reduced to one, the minimum, further, the fθ lens system for converging the four light beams into a specific size and scanning the beam spots with a substantially constant speed is composed of only two pairs of the fθ lens system 20A and fθ lens system 20B; and therefore, the optical scanning device 10 is made up with a fewer number of components than the conventional one, which successfully reduces the cost.

Further, the light beam 14Aa emitted from the light source 14A and the light beam 14Ba emitted from the light source 14B are designed to fall on the polygon mirror 26 with different angles in the sub-scanning direction, similarly, the light beam 14Ca emitted from the light source 14C and the light beam 14Da emitted from the light source 14D are designed to fall on the polygon mirror 26 with different angles in the sub-scanning direction; and therefore, the configuration of the light sources 14A through 14D can have a greater degree of freedom, and the thickness of the polygon mirror 26 and the fθ lens systems 20A, 20B in the sub-scanning direction can be thinned.

For example, if the light beam 14Aa emitted from the light source 14A and the light beam 14Ba emitted from the light source 14B are made to fall on the polygon mirror 26 with one and the same angle in the sub-scanning direction, since the light beam 14Aa and the light beam 14Ba are needed to be separated from each other in the sub-scanning direction, there will appear a restriction on the configuration of the light source 14A and the light source 14B, further, the thickness of the polygon mirror 26 and the fθ lens system 20A in the sub-scanning direction will become widened for the distance by which the light beam 14Aa and the light beam 14Ba are separated in the sub-scanning direction.

Further, if the light beam 14Aa and the light beam 14Ba are made to fall on with different angles in the sub-scanning direction, the spacing between the light beam 14Aa and the light beam 14Ba that are reflected on the polygon mirror 26 will increasingly be spread as the distance from the polygon mirror 26 increases, the optical components such as the plane mirrors 18A, 18B will become easy to dispose with regard to the light beam 14Aa and the light beam 14Ba after having passed through the fθ lens system 20A. This is the same with the light beam 14Ca and the light beam 14Da.

For example, if the light beam 14Aa and the light beam 14Ba are made to fall on with the same angle in the sub-scanning direction, the spacing between the light beam 14Aa and the light beam 14Ba that are reflected on the polygon mirror 26 will not be varied. Accordingly, if the spacing between the beams is not secured wide enough in advance, the optical components such as the plane mirrors 18A, 18B disposed with regard to the light beam 14Aa and the light beam 14Ba after having passed through the fθ lens system 20A will interfere with each other. This is the same with the light beam 14Ca and the light beam 14Da.

Further, since the light beam 14Ba having the greater incident angle θ in the sub-scanning direction against the light beam 14Aa having the smaller incident angle θ is designed to fall on the polygon mirror 26 on the side opposite to where the light sources 14A and 14B are laid out, the spacing between the light beam 14Aa and the light beam 14Ba in the sub-scanning direction can be secured in advance on the polygon mirror 26. Further, when the spacing between the light beam 14Aa and the light beam 14Ba reflected on the polygon mirror 26 is spreading, the spacing between the light beam 14Aa and the light beam 14Ba after having passed through the fθ lens system 20A can be secured still wider.

Thus, it becomes extremely easy to determine the configuration of the optical components disposed on the optical path of the photoreceptor side against the fθ lens systems 20A, 20B, namely in this embodiment, the plane mirrors 18A to 18C, and the cylindrical mirrors 24A to 24C.

The light beam 14Aa and the light beam 14Ba having transmitted through the fθ lens system 20A are given the angle adjustment in the sub-scanning direction by the plane mirrors 18A, 18B, and overpass the deflector 22 to reach the cylindrical mirrors 24C, 24D; and the light beam 14Aa and the light beam 14Ba reflected by the cylindrical mirrors 24C, 24D pass near the fθ lens system 20B so as to overpass the fθ lens system 20B.

Further, since there is a limit of the scanning angle that the deflector 22 can deflect, if intended to secure a specific scanning width (for example, a comparably wide width such as the width of A4 paper, and width of A3 paper) on the photoreceptors 38A through 38D, it becomes necessary to securely make the optical path length from the deflector 22 to the photoreceptors 38A through 38D long. However, since the optical path length can be secured long for the distance through which the light beam 14Aa and the light beam 14Ba pass so as to cross the device and pass across the device again, the dimension of the optical scanning device 10 in the axial direction S can be shrunk, and at the same time the optical scanning device 10 can be placed near to the photoreceptors 38A through 38D.

Further, since the rotation drive unit 28 is placed on the side that the light beams 14Aa, 14Ba, 14Ca, 14Da returned by the plane mirrors 18A to 18D pass through, against the polygon mirror 26, the dimension in the axial direction S of the device can be shrunk for the size by which the rotation drive unit 28 projects in the axial direction S of the polygon mirror 26.

Further, the optical scanning device 10 in this embodiment is made vertically long by arraying the optical components vertically, and the lateral width (horizontal dimension) of the multicolored image formation device can be shrunk accordingly, which makes it possible to install the multicolored image formation device in a considerably narrow space.

Further, if the dimensions, etc., of the parts are set as follows, it will be possible to provide the optical scanning device 10 for use in the multicolored image formation device that produces one multicolored image by superposing plural images (cyan image, magenta image, yellow image, black image) formed by plural light beams, with a low cost, small size, and high performance, thus achieving the object of the present invention. incident angle of the light beams 14Ba, 14Ca on the polygon mirror 26: $\theta=2.7°$ incident angle of the light beams 14Aa, 14Da on the polygon mirror 26: $\theta=1.2°$ And, the layout of the optical system on the locus that the light beams 14Aa, 14Da trace and the dimensions of the parts will be as follows.

number of plane of the polygon mirror 26: 12 planes diameter (inscribed diameter between the planes) of the polygon mirror 26: 19 mm height in the sub-scanning direction of the polygon mirror 26: 6 mm spacing between the polygon mirror 26 and the fθ lens 21: 11.3 mm radius of curvature (only in the main scanning direction) of the fθ lens 21 on the side of the polygon mirror 26: 127.97 mm thickness of the center of the fθ lens 21: 3 mm curvature of the fθ lens 21 on the far side from the polygon mirror 26: ∞ refractive index of the fθ lens 21: 1.608851 (wavelength= 787 nm) radius of curvature of the fθ lens 23 on the side of the polygon mirror 26: ∞ thickness of the center of the fθ lens 23: 6.5 mm radius of curvature (only in the main scanning direction) of the fθ lens 23 on the far side from the polygon mirror 26: 94.96 mm refractive index of the fθ lens 23: 1.711899 (wavelength= 787 nm)

distance between the fθ lens 23 and the plane mirror 18A (18D): 46.6 mm distance between the plane mirror 18A and cylindrical mirror 24C, distance between the plane mirror 18D and cylindrical mirror 24B: 129.3 mm radius of curvature (only in the sub-scanning direction) of the reflection plane of the cylindrical mirror 24B, 24C: 187.1 mm incident/outgoing angle on the cylindrical mirror 24B, 24C: q=68° spacing between the cylindrical mirror 24B, 24C and the photoreceptor 38B, 38C: 119.8 mm Further, in the foregoing embodiment, the light beams 14A*a*, 14B*a*, 14C*a*, 14D*a* are returned by the plane mirrors 18A to 18C, however the light beams 14A*a*, 14B*a* can be returned by one plane mirror, and similarly the light beams 14C*a*, 14D*a* can be returned by one plane mirror. Thereby, the optical components can be reduced still more.

Further, in the foregoing embodiment, the deflector 22 is provided with only one polygon mirror 26, but in case of more light beams provided, the one rotation drive unit 28 may be designed to rotate two polygon mirrors 26. In this case, the fθ lens system is disposed on both sides of the polygon mirror 26 added.

The optical scanning device of the present invention being thus described, the number of the deflector that deflects the light beams with a constant angular velocity in the direction corresponding to the main scanning direction is minimized to one, and the number of the polygon mirror included in the deflector is reduced to the minimum one, and further the fθ lens system for converging the light beams into a specific size and scanning the beam spots with a substantially constant speed is composed of only two pairs of the fθ lenses; and therefore, the optical scanning device is made up with a fewer number of components than the conventional one, which successfully reduces the cost.

What is claimed is:

1. An optical scanning device used in a multicolored image formation device that superposes a plurality of images formed on photoreceptors by a plurality of light beams to obtain one multicolored image, the optical scanning device comprising:

a single deflector that contains a single polygon mirror and a single rotation drive unit for rotating the polygon mirror, and reflects and deflects the light beams incident on the polygon mirror in a main scanning direction;

a plurality of light sources that emit the plurality of the light beams, respectively, on the polygon mirror from both sides of the polygon mirror in a direction transverse to a rotation axis thereof; and two pairs of fθ lenses that are disposed on the both sides of the polygon mirror in the direction transverse to the rotation axis thereof, and at least transmit the light beams reflected and deflected by the mirror to form spot images on the photoreceptors, wherein the plurality of the light beams are made incident on and emitted from each of both sides of the polygon mirror in the direction transverse to the rotation axis thereof, and the plurality of the light beams incident on the polygon mirror have different incident angles in the sub-scanning direction on each of both sides.

2. The optical scanning device according to claim 1, wherein, when the plurality of light beams incident on both sides of the polygon mirror fall with an angle to a plane perpendicular to the rotation axis of the polygon mirror from one side in the sub-scanning direction, on each of both sides of the polygon mirror, wherein an incident point on the polygon mirror on which the light beam forming a greater incident angle to the perpendicular plane falls is positioned on one side in the sub-scanning direction against an incident point on the polygon mirror on which the light beam forming a smaller incident angle to the perpendicular plane falls.

3. The optical scanning device according to claim 1, wherein the fθ lens transmits the light beam incident on the polygon mirror and the light beam reflected and deflected by the polygon mirror, and is located on a position that the light beam falls on the polygon mirror from the center of a scanning angle formed by the reflected and deflected light beam, and a width of the light beam incident on the polygon mirror in the main scanning direction is greater than a plane width of the polygon mirror in a rotary direction thereof.

4. The optical scanning device according to claim 1, wherein the plurality of fθ lenses, a first reflection mirrors, and a second reflection mirrors are arrayed vertically, and the light beams are made incident on the sides of the plurality of the photoreceptors vertically arrayed.

5. An optical scanning device used in a multicolored image formation device that superposes a plurality of images formed on photoreceptors by a plurality of light beams to obtain one multicolored image, the optical scanning device comprising:

a single deflector that contains at least one or more polygon mirrors and a single rotation drive unit for rotating the polygon mirrors, and reflects and deflects the light beams incident on the polygon mirrors in a main scanning direction;

a plurality of light sources that emit the plurality of light beams, respectively, on the polygon mirrors from both sides of the polygon mirrors in a direction transverse to a rotation axis thereof, two pairs or four pairs of fθ lenses that are disposed on both sides of the polygon mirrors in the direction transverse to the rotation axis thereof, and at least transmit the light beams reflected and deflected by the polygon mirrors to form spot images on the photoreceptors;

a plurality of first reflection mirrors that return the plurality of the reflected and deflected light beams having transmitted through the fθ lenses to one side of a direction of the rotation axis; and a plurality of second reflection mirrors disposed on one side of the direction of the rotation axis, which reflect the light beams reflected by the first reflection mirrors toward the photoreceptors that are disposed on the other side of the direction of the rotation axis.

6. The optical scanning device according to claim 5, wherein the first reflection mirrors return at least one of the plurality of reflected and deflected light beams having transmitted through the fθ lenses to one side of the direction of the rotation axis and a direction to overpass the polygon mirrors.

7. The optical scanning device according to claim 5, wherein the rotation drive unit is located on a side of the polygon mirrors opposite to the side facing the photoreceptors.

8. The optical scanning device according to claim 5, wherein the fθ lens is located between the second reflection mirror and a photoreceptor, and the light beam reflected by the second reflection mirror passes near the fθ lens in the direction transverse to the optical axis of the fθ lens and reaches the photoreceptor.

9. The optical scanning device according to claim 5, wherein
   the fθ lens transmits the light beam incident on the polygon mirror and the light beam reflected and deflected by the polygon mirror, and is located on a position that the light beam falls on the polygon mirror from the center of a scanning angle formed by the reflected and deflected light beam, and
   a width of the light beam incident on the polygon mirror in the main scanning direction is greater than a plane width of the polygon mirror in a rotational direction thereof.

10. The optical scanning device according to claim 9, wherein the fθ lens has a power only in the main scanning direction.

11. The optical scanning device according to claim 5, wherein the plurality of fθ lenses, first reflection mirrors, and second reflection mirrors are arrayed vertically, and the light beams are made incident on the sides of the plurality of photoreceptors vertically arrayed.

12. An optical scanning device comprising:
   a deflector that contains a polygon mirror and a rotation drive unit for rotating the polygon mirror, and reflects and deflects a light beam incident on the polygon mirror in a main scanning direction, wherein the light beams incident on the polygon mirror have different incident angles in the sub-scanning direction;
   at least a light source that emits the light beam on the polygon mirror;
   an fθ lens that is disposed in the direction transverse to a rotation axis of the polygon mirror, and at least transmits the light beam reflected and deflected by the polygon mirror to form a spot image on a photoreceptor; and
   a housing having attachment planes on which the deflector, light source, and fθ lens are mounted, wherein
      the attachment planes of the housing are located in a direction transverse to the horizontal direction.

* * * * *